US010075821B2

(12) United States Patent
Mustajarvi (10) Patent No.: US 10,075,821 B2
(45) Date of Patent: Sep. 11, 2018

(54) SUBSCRIBER GROUP BASED CELL BROADCAST

(71) Applicant: NOKIA SOLUTIONS AND NETWORKS OY, Espoo (FI)

(72) Inventor: Jari Pekka Mustajarvi, Espoo (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 14/405,862

(22) PCT Filed: Jul. 10, 2013

(86) PCT No.: PCT/EP2013/064545
§ 371 (c)(1),
(2) Date: Dec. 5, 2014

(87) PCT Pub. No.: WO2014/009401
PCT Pub. Date: Jan. 16, 2014

(65) Prior Publication Data
US 2015/0172876 A1    Jun. 18, 2015

(30) Foreign Application Priority Data

Jul. 13, 2012 (EP) .................. PCT/EP2012/063790

(51) Int. Cl.
*H04W 4/08* (2009.01)
*H04W 88/06* (2009.01)
(Continued)

(52) U.S. Cl.
CPC ........... *H04W 4/08* (2013.01); *H04L 61/2069* (2013.01); *H04W 4/06* (2013.01); *H04W 4/90* (2018.02); *H04W 76/40* (2018.02); *H04W 88/06* (2013.01)

(58) Field of Classification Search
CPC ... H04W 4/08; H04W 72/005; H04W 76/002; H04W 28/08; H04W 4/06; H04W 36/14;
(Continued)

(56) References Cited

U.S. PATENT DOCUMENTS 8,874,083 B2 * 10/2014 Adjakple ................ H04W 4/08
455/411
2005/0201331 A1 * 9/2005 Gaal ...................... H04B 7/024
370/332
(Continued)

FOREIGN PATENT DOCUMENTS

CN       1867181 A     11/2006
WO   WO 2007/044881 A2   4/2007

OTHER PUBLICATIONS

International Search Report & Written Opinion dated Jan. 3, 2014 corresponding to International Patent Application No. PCT/EP2013/064545.
(Continued)

*Primary Examiner* — Olumide Ajibade Akonai
(74) *Attorney, Agent, or Firm* — Squire Patton Boggs (US) LLP (57) ABSTRACT

There are provided measures for subscriber group based cell broadcast. Such measures exemplarily comprise receiving a broadcast service message, said broadcast service message comprising at least first information indicative of a target subscriber group, and second information relating to network selection, comparing said first information with a preconfigured identifier indicative of an own subscriber group membership, and processing said broadcast service message based on a comparison result.

15 Claims, 7 Drawing Sheets

(51) Int. Cl.
*H04W 4/06* (2009.01)
*H04L 29/12* (2006.01)
*H04W 4/90* (2018.01)
*H04W 76/40* (2018.01)

(58) Field of Classification Search
CPC ..... H04W 48/06; H04W 48/10; H04W 48/12; H04W 24/02; H04W 28/025; H04W 24/28; H04W 24/025; H04W 76/40; H04W 72/0406; H04W 48/16; H04W 72/02; H04W 72/042; H04W 88/06; H04L 29/12292; H04L 61/2069; H04L 12/18
See application file for complete search history.

(56) References Cited

U.S. PATENT DOCUMENTS

| | | | | |
|---|---|---|---|---|
| 2005/0272455 | A1* | 12/2005 | Oommen | H04W 4/08 455/518 |
| 2009/0164587 | A1* | 6/2009 | Gavita | H04L 12/1818 709/206 |
| 2010/0323698 | A1 | 12/2010 | Rune et al. | |
| 2012/0106431 | A1* | 5/2012 | Wu | H04W 4/00 370/312 |
| 2012/0140632 | A1* | 6/2012 | Norp | H04L 47/10 370/235 |
| 2013/0083717 | A1* | 4/2013 | Vos | H04W 4/06 370/312 |

OTHER PUBLICATIONS

KPN: "Group Based Addressing Solution from 23.888," 3GPP Draft, SA WG2 Meeting #92, S2-122753, Barcelona, Spain, Jul. 3, 2012, pp. 1-4, XP050633281.

Alcatel Lucent: "Wi-Fi Roaming—Building on ANDSF and Hotspot2. 0," Internet Citation, pp. 1-45, XP002677915, retrieved from the Internet: http://www.alcatel-lucent.com, retrieved on Feb. 27, 2012.

English Language Translation of Chinese Office Action dated Jul. 27, 2017, issued in corresponding CN Aplication No. 201380037383. 3.

* cited by examiner

SUBSCRIBER GROUP BASED CELL BROADCAST

FIELD

The present invention relates to subscriber group based cell broadcast. More specifically, the present invention exemplarily relates to measures (including methods, apparatuses and computer program products) for realizing subscriber group based cell broadcast.

BACKGROUND

The present invention generally relates to dynamic control, from network side, of network selection by terminals connecting to the network, via subscriber group based cell broadcast.

In network deployments like Long Term Evolution (LTE) or LTE-Advanced networks, in order to enable efficient offloading of traffic from the main radio link to e.g. Wi-Fi networks (Wi-Fi offloading), operators prefer having some degree of control over the terminal's (e.g. user equipment (UE)) Wi-Fi usage. Current major smart phone platforms (iOS, Android and Windows Phone) work such that, when a detected Wi-Fi network is known by the device (that is, a user or a provisioning server has configured certain Wi-Fi network details so that the UE can connect to that Wi-Fi network), the UE automatically connects to that Wi-Fi (assuming that the Wi-Fi radio module of the UE is not turned off by the user).

In such scenario, which Wi-Fi network is used by the UE can be only influenced by the operator (the network) by affecting which Wi-Fi networks are known by the UE. That is, if the operator wants the UE to use a certain Wi-Fi network, the certain Wi-Fi network is made known to the UE, and if a certain Wi-Fi network should not be used anymore by the UE, that certain Wi-Fi network is to be removed from known Wi-Fi networks within a UE's internal Wi-Fi database.

Besides proprietary solutions to handle the above mentioned requirements of the operator/network, which are deployed only in very small scale, the Third Generation Partnership Project (3GPP) Access Network Discovery and Selection Function (ANDSF) provides standardized functionality which may handle the scenario described above. Namely, ANDSF server and UE client functionality is defined. ANDSF relies on an Open Mobile Alliance (OMA) device management (DM) framework for ANDSF information exchange between the server (i.e. the ANDSF Server) and client (i.e. the UE).

According to 3GPP specifications, ANDSF provides inter-system mobility policy (ISMP), Discovery Information as well as inter-system routing policy (ISRP), which are described below.

ISMP can be used to prioritize Wi-Fi networks over each other and also over 3GPP networks. ISMP is used when the UE does not support simultaneous 3GPP and Wi-Fi radio usage. An example of prioritized ISMP would be Wi-Fi with service set identifier (SSID)=Operator_A having highest priority followed by any Wi-Fi available, with 3GPP radio accesses having the lowest priority. Following this policy, the UE would connect to the network access of available network accesses having the highest priority according to the policy. ISMP was introduced in 3GPP Release 8.

Discovery Information can be used to tell the UEs where certain Wi-Fi networks are available. Each Wi-Fi network may be associated with a location area identifier that can be based e.g. on 3GPP identifiers (location area code (LAC), tracking area code (TAC) and/or cell identities (ID), etc.) to allow the device to optimize Wi-Fi scanning. Also, it is possible to configure Wi-Fi access details, like used extensible authentication protocol (EAP) methods and their respective credentials or pre-shared key (PSK) for certain Wi-Fi network. In practice, Discovery Information can be used to make Wi-Fi networks "known" to the UEs. That is, a UE is able connect to the identified Wi-Fi networks after receiving respective Discovery Information.

ISRP can be used to prioritize radio accesses for specific applications. Applications are identified with internet protocol (IP) 5-tuples, e.g. with IP addresses, IP protocol and IP protocol port numbers. With Rel-11, it is also possible to identify traffic with fully qualified domain network (FQDN) or with operating system (OS)-specific Application ID. With ISRP, it is assumed that the device (i.e. UE) can use both 3GPP and Wi-Fi radio accesses simultaneously. An example of prioritized ISRP would be for YouTube traffic (identified application) Wi-Fi with SSID=Operator_A having highest priority followed by any Wi-Fi available, with 3GPP radio accesses having the lowest priority. Following this policy, the UE would use for the identified application the network access of available network accesses having the highest priority according to the policy.

This information (ISMP, Discovery Information, ISRP) is conveyed in an ANDSF Management Object (MO). Additionally, ANDSF MO can be used to convey location information of the UE to the ANDSF server during ANDSF session.

It is to be noted that ANDSF server and client implementations may support any combination of the above described ANDSF functionality.

It is further to be noted that ANDSF is not very suitable for real-time operations due to its dependency on the OMA DM framework.

In particular, setting up an ANDSF session can take several seconds. Further the transfer between the server and client of the actual ANDSF information may cause a further delay. Thus, the basic use model for ANDSF is such that the ANDSF information (ISMP, Discovery Information, ISRP) is provisioned to the UE, and then UE uses the same set of information for a certain period of time. Such period may for example be one week. Consequently, the actual ANDSF information can be considered as being static, which does not support a dynamic control.

In order to provide a dynamic ANDSF that could react e.g. to changing load conditions as requested by the network operators, cell broadcast technology might be used to deliver ANDSF content to the UEs. This cell broadcast technology may include 2G/3G Cell Broadcast Service (CBS) and also 4G Earthquake and Tsunami Warning System (ETWS) and Commercial Mobile Alert Service (CMAS) systems.

Presently, the cell broadcast technology for both full ANDSF content delivery and partial content delivery is just used locally to modify ANDSF content provided by (optional) standard ANDSF server.

However, in view of the above, the problem arises that cell broadcast technology does not consider different subscriber groups since the same data is sent to every terminal in the area (broadcast). For example in an overload situation, an operator might want to keep some subscriber segment in 3GPP network, while another subscriber segment might be intended to be put into wireless local area networks (WLAN) when available.

Hence, there is a need to provide for subscriber group based cell broadcast.

SUMMARY

According to an aspect of the present invention, there is provided a method comprising receiving a broadcast service message, said broadcast service message comprising at least first information indicative of a target subscriber group, and second information relating to network selection, comparing said first information with a preconfigured identifier indicative of an own subscriber group membership, and processing said broadcast service message based on a comparison result.

According to an aspect of the present invention, there is provided a method comprising transmitting a broadcast service message, said broadcast service message comprises at least first information indicative of a target subscriber group and second information relating to network selection intended for said target subscriber group.

According to an aspect of the present invention, there is provided an apparatus comprising a connection controller configured to receive a broadcast service message, said broadcast service message comprising at least first information indicative of a target subscriber group, and second information relating to network selection, and a control module configured to compare said first information with a preconfigured identifier indicative of an own subscriber group membership, and to process said broadcast service message based on a comparison result.

According to an aspect of the present invention, there is provided an apparatus comprising a connection controller configured to transmit a broadcast service message, said broadcast service message comprising at least first information indicative of a target subscriber group and second information relating to network selection intended for said target subscriber group.

According to an aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient dynamic influence by an operator how different subscriber classes/groups/segments are treated in different load situations as far as access network selection is concerned.

By way of embodiments of the present invention, there is provided subscriber group based cell broadcast. More specifically, by way of embodiments of the present invention, there are provided measures and mechanisms for realizing subscriber group based cell broadcast.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain network configurations and deployments. Namely, the present invention and its embodiments are mainly described in relation to 3GPP specifications being used as non-limiting examples for certain network configurations and deployments. As such, the description of embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

In particular, the present invention and its embodiments may be applicable in any network compound in which terminals can connect besides to 3GPP radio accesses also to Wi-Fi radio accesses (simultaneously or exclusively).

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to embodiments of the present invention, in general terms, there are provided measures and mechanisms for (enabling/realizing) subscriber group based cell broadcast.

To enable such dynamic control of network selection, subscriber segmentation is to be enabled when cell broadcast technology used to deliver ANDSF settings, as is described in the following.

Figure 1:
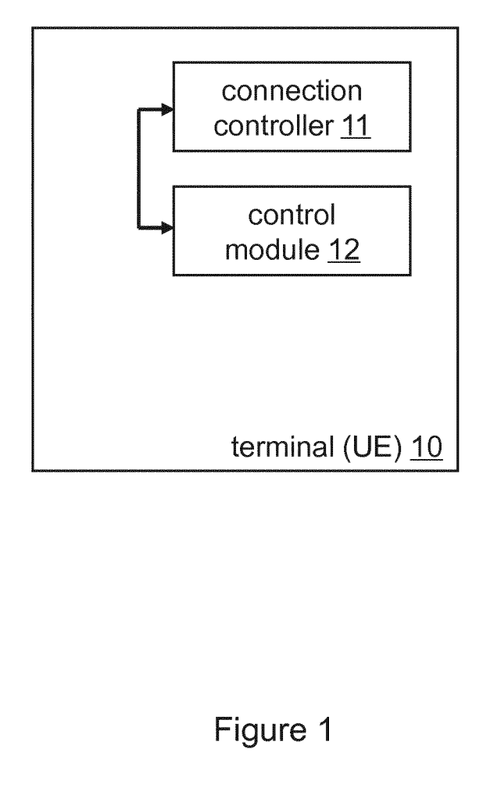
FIG. 1 is a block diagram illustrating an apparatus according to embodiments of the present invention.

FIG. 1 is a block diagram illustrating an apparatus according to embodiments of the present invention.

As shown in FIG. 1, according to embodiments of the present invention, the apparatus is a terminal 10 including a connection controller 11 and a control module 12. The connection controller 11 receives a broadcast service message, the broadcast service message including at least first information indicative of a target subscriber group, and second information relating to network selection. The control module 12 compares the first information with a preconfigured identifier indicative of an own subscriber group membership. Further, the control module 12 processes the broadcast service message based on a comparison result.

In other words, to enable subscriber segmentation, the message transmitted using the cell broadcast technology is to be tagged with information (for example a message identifier) which is associated to the respective subscriber segment. If a terminal is not part of a subscriber segment/group which is identified by the (first) information, this terminal would not listen for ANDSF cell broadcast data, i.e. would not process the payload data of the broadcast message.

According to further embodiments, the connection controller 11 receives, via a control signaling, the preconfigured identifier.

That is, the terminal has to know which identifier is assigned to it's subscriber segment/group, i.e. to itself. This identifier is received prior to receiving the broadcast service message in order to compare the first information (e.g. the broadcast service message identifier) with the previously received and thus preconfigured identifier.

The control signalling may for example be one of the following: If full ANDSF content is delivered via cell broadcast technology without presence of standard ANDSF server, subscribers would have to receive the identifier assigned to their group via delivery path other than conventional ANDSF (external means, out-of-band), e.g. via Over The Air (OTA) transmission, or OMA DM, or like other network settings that are currently delivered to various mobile devices by operators. If standard ANDSF service is deployed underneath and only updates to the ANDSF MO, which are originally provisioned to the device via standard point-to-point ANDSF mechanisms that are provided via cell broadcast technology, then the subscriber group identifier could be provided as part of an ANDSF MO.

According to further embodiments of the present invention, the received identifier is the broadcasted service subscriber group identifier. That is, this subscriber group identifier is made equal to the first information (e.g. cell broadcast service message identifier) the terminal shall listen to for ANDSF cell broadcast service messages. This would also implicitly hide subscriber class, and allows any number of subscriber groups to be assigned. If the device does not have a certain subscriber group identifier, it would not listen for ANDSF cell broadcast data, i.e. would not process the payload data of the broadcast message.

According to further embodiments of the present invention, the first information is formed by a broadcast service message identifier of the broadcast service message or a part of the broadcast service message identifier. In this case, the control module 12 processes the broadcast service message only if the broadcast service message identifier or the part of the broadcast service message identifier matches with the preconfigured identifier.

According to further embodiments of the present invention, the first information is formed by a combination of the broadcast service message identifier or a part of the broadcast service message identifier with a serial number of the broadcast service message or a part of the serial number. In this case, the control module 12 processes the broadcast service message only if the combination matches with the preconfigured identifier.

According to further embodiments of the present invention, the first information is formed by a part of payload data of the broadcast service message. In this case, the control module 12 processes the broadcast service message only if the part of payload data matches with the preconfigured identifier.

It is held to be clear that the first information can be formed by various elements of the header of the payload portion of a broadcast service message or parts thereof and is not limited to the above mentioned exemplary embodiments.

In other words, subscribers can be grouped in various classes/groups. Each subscriber group can be identified separately in the cell broadcast content. A terminal can be provisioned with subscriber class and this subscriber class is then present or identifiable in the broadcasted message.

Forming of the first information could be as simple as cell broadcasting a message identifier. In such case, each subscriber group is listening to an own identifier. It could further be a combination of the message identifier and serial number which also is part of the cell broadcasting message header. At that, not all bits of the message identifier or serial number need to be used for this identification. It could be only a few bits of the serial number (which has an internal sub structure). Alternatively the subscriber group can be included into the message payload. In this case, a terminal would read all ANDSF messages from cell broadcast but would interpret only those identified to its own subscriber group. A same message could indicate also several subscriber groups at the same time.

It is to be noted that according to embodiments of the present invention the broadcast service may be a 2G/3G CBS, and a 4G ETWS or a 4G CMAS. Further, the second information may include at least connection information for at least one network, and/or may be access network discovery and selection function ANDSF configuration data.

Figure 2:
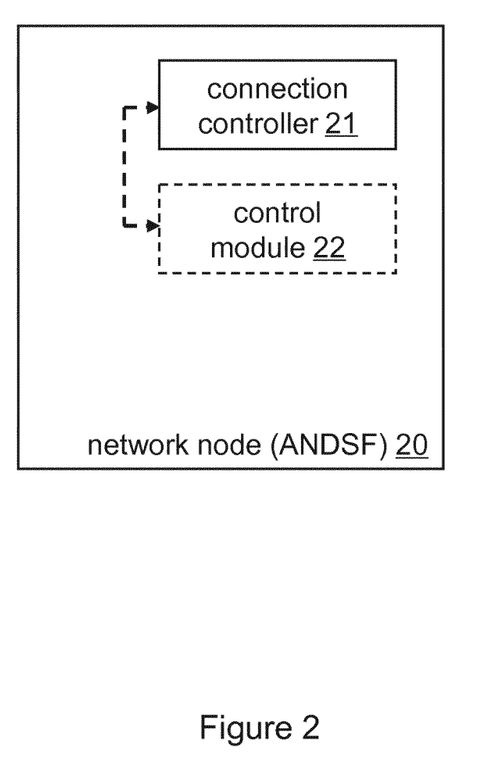
FIG. 2 is a block diagram illustrating an apparatus according to embodiments of the present invention.

FIG. 2 is a block diagram illustrating an apparatus according to embodiments of the present invention.

As shown in FIG. 2, according to embodiments of the present invention, the apparatus is a network node 20 including a connection controller 21. The connection controller 21 transmits a broadcast service message, the broadcast service message including at least first information indicative of a target subscriber group and second information relating to network selection intended for the target subscriber group.

That is, the operator (network side) may select certain subscriber groups that should use certain other networks or that should avoid using other networks. Such selection might be based on various variables. One variable is the load condition of the respective controlled 3GPP network. That is, the selection by the operator might be based on the load conditions of the 3GPP network, but is not limited thereto. The order to use or to avoid (or other orders) certain networks is tagged with a first information (e.g. broadcast service message identifier) that belongs to the selected subscriber group, such that each member of the selected subscriber group is able to identify itself as recipient.

According to further embodiments of the present invention, the apparatus further includes a control module 22 (marked with dashed lines). The control module 22, prior to a transmission of the cell broadcast message, allocates, to each subscriber of a plurality of broadcast service subscriber groups, an identifier corresponding to the respective broadcast service subscriber group. Further, the connection controller 21 transmits, via a control signaling, to each subscriber of the plurality of broadcast service subscriber groups, the respective allocated identifier. At that, in case of the target subscriber group, the allocated identifier matches with the first information.

In other words, different identifiers are allocated to different subscriber groups and these identifiers are delivered to each (respective) subscriber. If full ANDSF content is delivered via cell broadcast technology without presence of standard ANDSF server, the respective identifiers can be delivered (control signaling) via delivery path other than conventional ANDSF (i.e. via external means, out-of-band), e.g. via OTA transmissions, or OMA DM, or like other network settings are currently delivered to various mobile devices by operators. If standard ANDSF service is deployed underneath and cell broadcast technology only provides updates to the ANDSF MO provisioned to the device via standard point-to-point ANDSF mechanisms, then the respective identifier could also be provided (control signaling) as part of ANDSF MO.

According to further embodiments of the present invention, the allocated identifier is a broadcasted subscriber group identifier, by which a subscriber group is identified. In other words, if the subscriber group identifier is made to be equal to the first information (e.g. cell broadcast message identifier) the device shall listen to for ANDSF cell broadcast messages. This would also implicitly hide subscriber class and allows any number of groups to be assigned. If a subscriber does not have this subscriber group identifier, it would not consider data transmitted in a broadcast message.

When the identifier to listen to is delivered via ANDSF MO, the following exemplary modification can be implemented:

According to embodiments of the present invention, the (cell broadcast message) identifier to listen to is stored into ANDSF MO so that every operator can define its own message identifier. For example a new intermediate node ANDSF/CBS is defined in the ANDSF MO. This new intermediate node might be placed on a previously defined location in the ANDSF MO structure. However, this new intermediate node can also be placed on an arbitrary location in the ANDSF MO structure, which can subsequently be found by the receiving terminal by means of pre-programmed rules or pre-defined naming conventions of the respective node name. ANDSF/CBS/<X> allows each operator to define an own node for operator specific data. ANDSF/CBS/<X>/PLMN identifies the operator and ANDSF/CBS/<X>/CBSMessageID defines used (cell broadcast message) identifier for current registered public land mobile network (RPLMN). Alternatively the public land mobile network (PLMN) identifier could be used directly as the name for the <X> node to allow quick access to the correct message identifier. According to ANDSF standard, the <X> node can be any character string as long as it is unique within parent node. Furthermore, the above suggested node names may be suitably modified or chosen.

According to further embodiments of the present invention, the first information is formed by a broadcast service message identifier of the broadcast service message or a part of the broadcast service message identifier.

According to further embodiments of the present invention, the first information is formed by a combination of the broadcast service message identifier or a part of the broadcast service message identifier with a serial number of the broadcast service message or a part of the serial number.

According to further embodiments of the present invention, the first information is formed by a part of payload data of the broadcast service message.

According to further embodiments of the present invention, prior to the transmission of the cell broadcast message, the control module 22 selects, from the plurality of broadcast service subscriber groups, a broadcast service subscriber group as the target subscriber group.

That is, based on e.g. load conditions of the 3GPP network, the operator (network side) selects certain subscriber groups as the intended recipient of the e.g. control information contained in the cell broadcast message.

Figure 3:
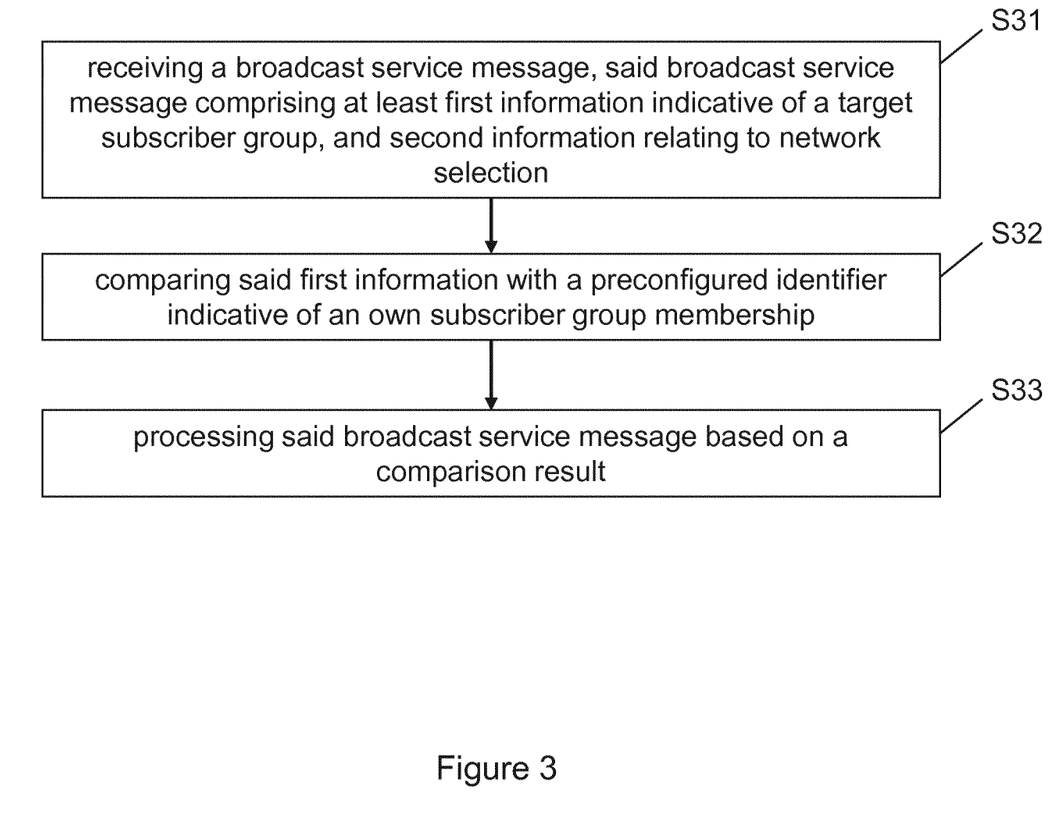
FIG. 3 is a schematic diagram of a procedure according to embodiments of the present invention.

FIG. 3 is a schematic diagram of a procedure according to embodiments of the present invention.

As shown in FIG. 3, a procedure according to embodiments of the present invention includes an operation of receiving a broadcast service message, the broadcast service message including at least first information indicative of a target subscriber group, and second information relating to network selection (S31), an operation of comparing the first information with a preconfigured identifier indicative of an own subscriber group membership (S32), and an operation of processing the broadcast service message based on a comparison result (S33).

Figure 4:
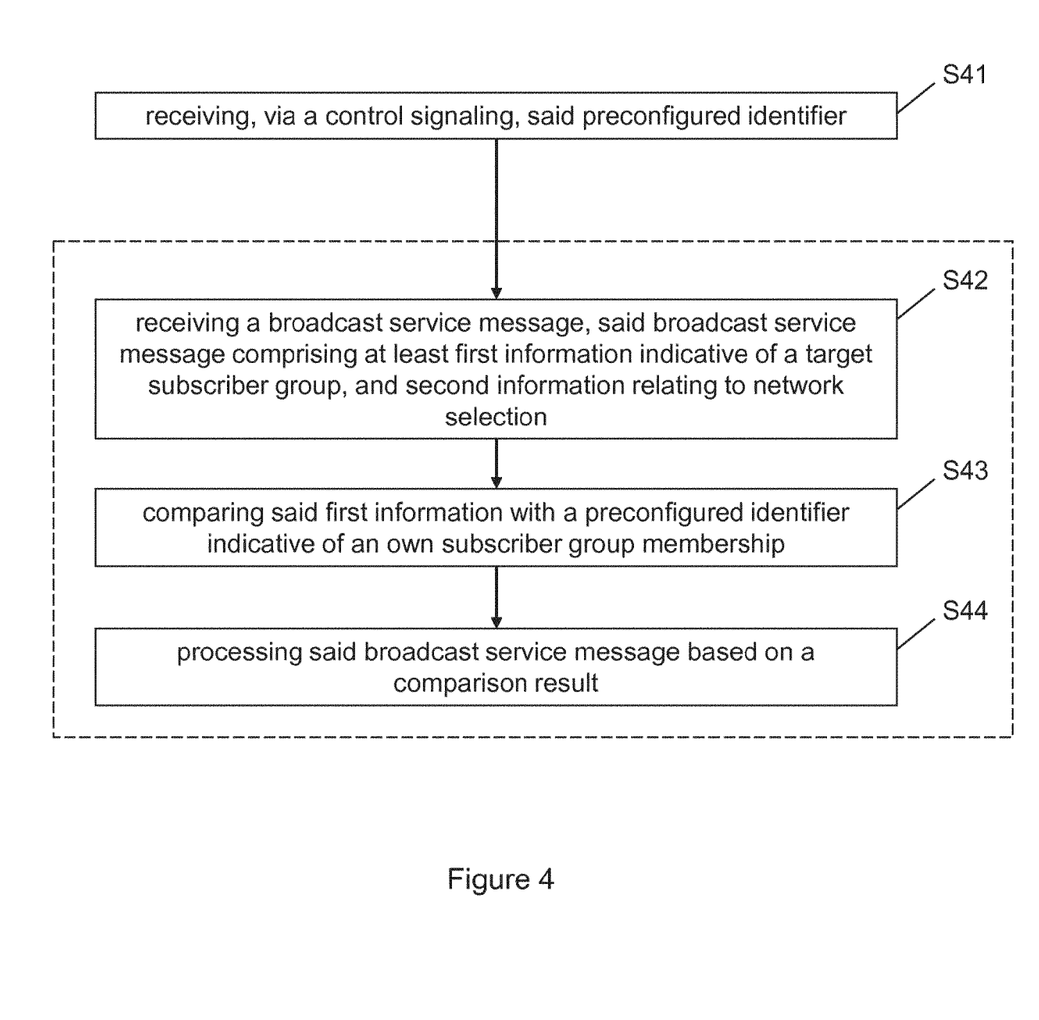
FIG. 4 is a schematic diagram of a procedure according to embodiments of the present invention.

FIG. 4 is a schematic diagram of a procedure according to embodiments of the present invention.

In particular, FIG. 4 is a schematic diagram of a variation of the procedure shown in FIG. 3. Namely, according to FIG. 4, an additional operation is given, which is inherently independent from each other as such. According to such variation, a method according to embodiments of the present invention may comprise an operation of receiving, via a control signaling, the preconfigured identifier (S41).

According to further embodiments of the present invention, the first information is formed by a broadcast service message identifier of the broadcast service message or a part of the broadcast service message identifier. In this case, the broadcast service message is processed if the broadcast service message identifier or the part of the broadcast service message identifier matches with the preconfigured identifier.

According to further embodiments of the present invention, the first information is formed by a combination of the broadcast service message identifier or a part of the broadcast service message identifier with a serial number of the broadcast service message or a part of the serial number. In this case, the broadcast service message is processed if the combination matches with the preconfigured identifier.

According to further embodiments of the present invention, the first information is formed by a part of payload data of the broadcast service message. In this case, the broadcast service message is processed if the part of payload data matches with the preconfigured identifier.

Figure 5:
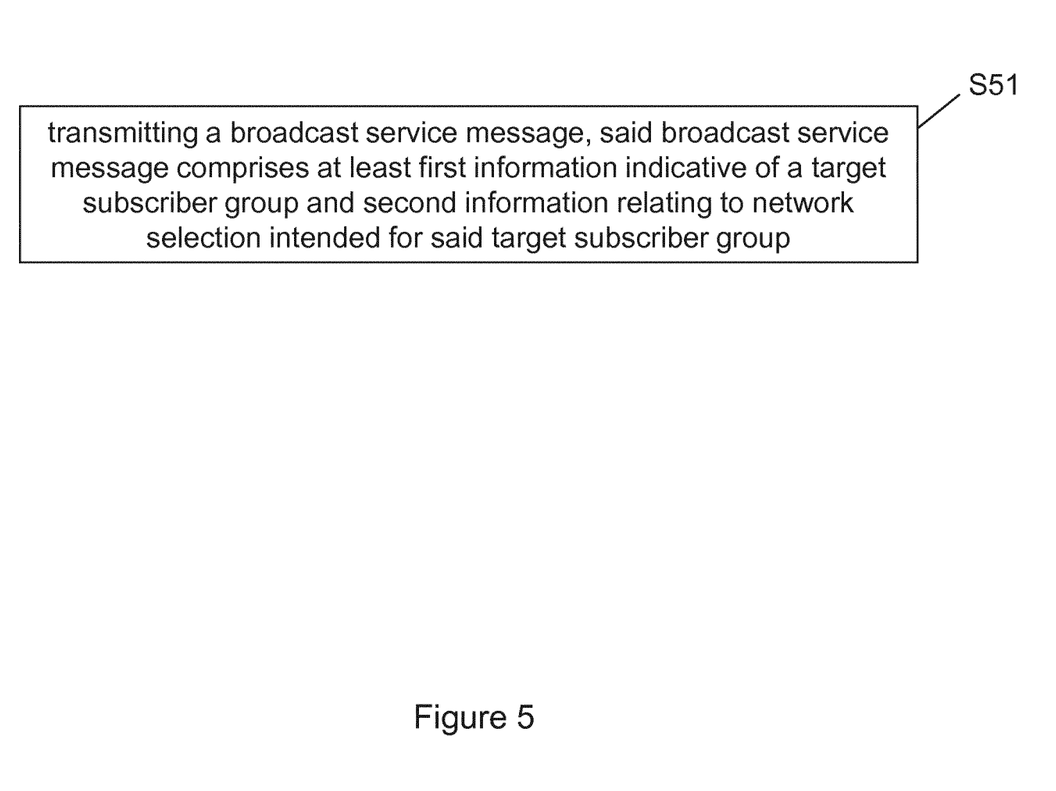
FIG. 5 is a schematic diagram of a procedure according to embodiments of the present invention.

FIG. 5 is a schematic diagram of a procedure according to embodiments of the present invention.

As shown in FIG. 5, a procedure according to embodiments of the present invention includes an operation of transmitting a broadcast service message, the broadcast service message includes at least first information indicative of a target subscriber group and second information relating to network selection intended for the target subscriber group (S51).

Figure 6:
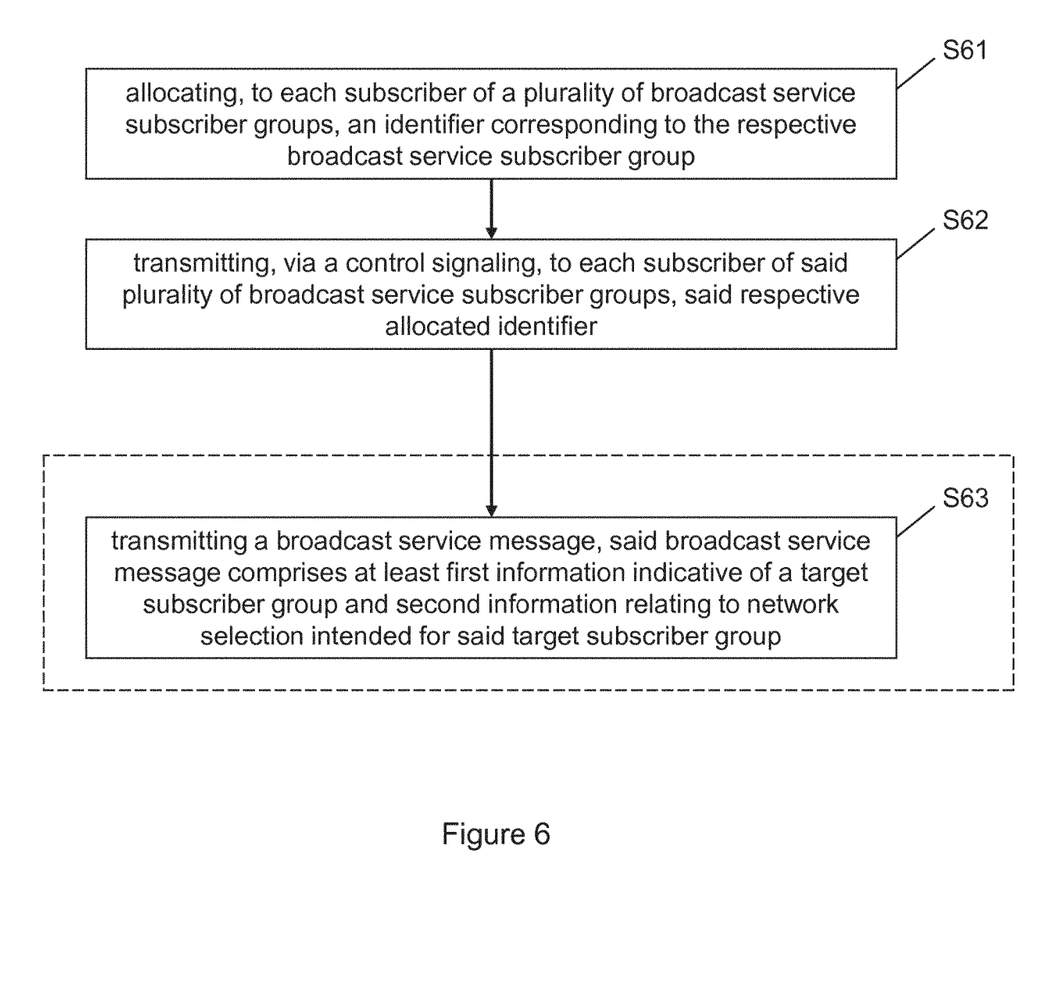
FIG. 6 is a schematic diagram of a procedure according to embodiments of the present invention.

FIG. 6 is a schematic diagram of a procedure according to embodiments of the present invention.

In particular, FIG. 6 is a schematic diagram of a variation of the procedure shown in FIG. 5. Namely, according to FIG. 6, additional operations are given, which are inherently independent from each other as such. According to such variation, a method according to embodiments of the present invention may include an operation of allocating, to each subscriber of a plurality of broadcast service subscriber groups, an identifier corresponding to the respective broadcast service subscriber group (S61), and an operation of transmitting, via a control signaling, to each subscriber of the plurality of broadcast service subscriber groups, the respective allocated identifier (S62). At that, in case of the target subscriber group, the allocated identifier matches with the first information.

According to further embodiments of the present invention, the first information is formed by a broadcast service message identifier of the broadcast service message or a part of the broadcast service message identifier.

According to still further embodiments of the present invention, the first information is formed by a combination of the broadcast service message identifier or a part of the broadcast service message identifier with a serial number of the broadcast service message or a part of the serial number.

According to still further embodiments of the present invention, the first information is formed by a part of payload data of the broadcast service message.

According to of a variation of the procedure shown in FIGS. 5 and 6, an additional operation is given, which is inherently independent from each other as such. According to such variation, a method according to embodiments of the present invention may include, prior to the operation of transmitting, an operation of selecting, from the plurality of broadcast service subscriber groups, a broadcast service subscriber group as the target subscriber group (S63).

The above-described procedures and functions may be implemented by respective functional elements, processors, or the like, as described below.

In the foregoing description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 7:
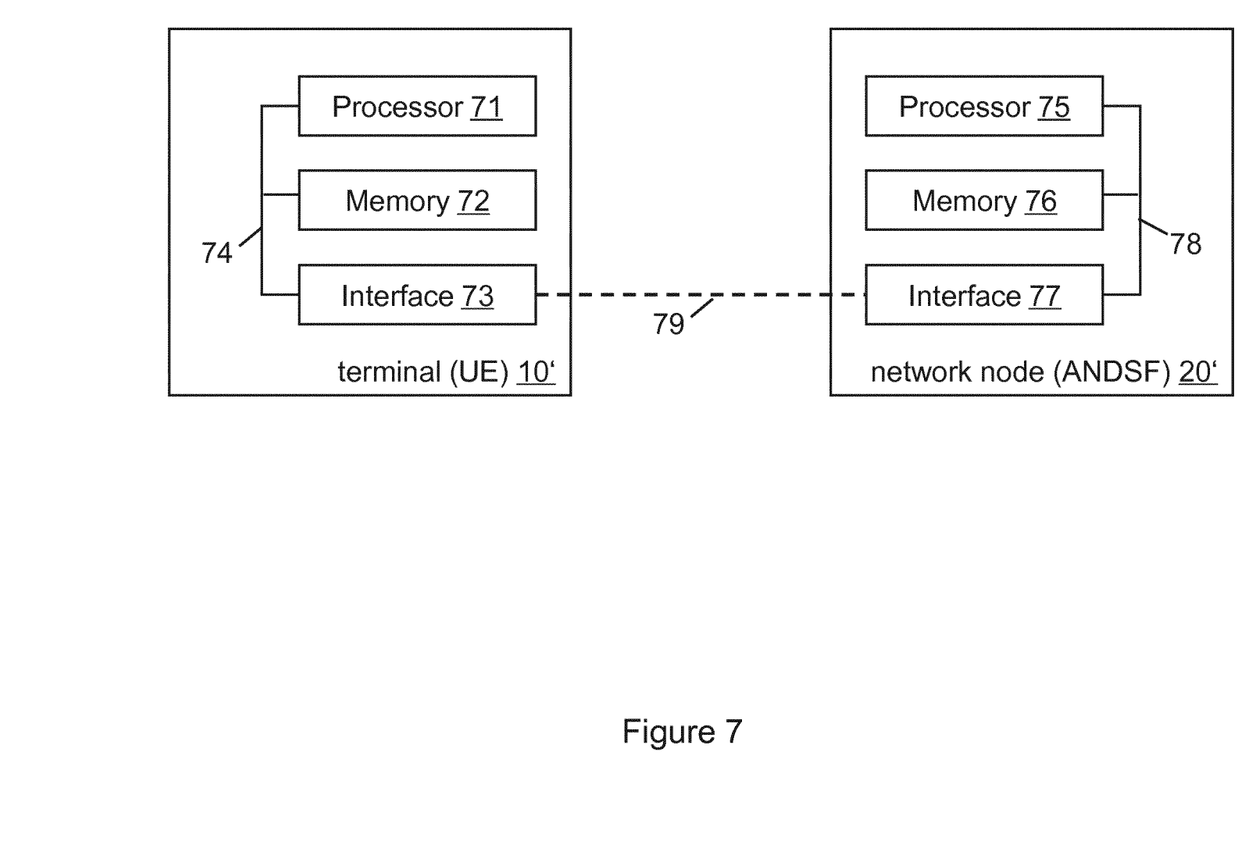
FIG. 7 is a block diagram alternatively illustrating apparatuses according to embodiments of the present invention.

In FIG. 7, an alternative illustration of apparatuses according to embodiments of the present invention is depicted. As indicated in FIG. 7, according to embodiments of the present invention, the apparatus (terminal) 10' (corresponding to the terminal 10) includes a processor 71, a memory 72 and an interface 73, which are connected by a bus 74 or the like. Further, according to embodiments of the present invention, the apparatus (network node) 20' (corresponding to the network node 20) includes a processor 75, a memory 76 and an interface 77, which are connected by a bus 78 or the like, and the apparatuses may be connected via link 79, respectively.

The processor 71/75 and/or the interface 73/77 may also include a modem or the like to facilitate communication over a (hardwire or wireless) link, respectively. The interface 73/77 may include a suitable transceiver coupled to one or more antennas or communication means for (hardwire or wireless) communications with the linked or connected device(s), respectively. The interface 73/77 is generally configured to communicate with at least one other apparatus, i.e. the interface thereof.

The memory 72/76 may store respective programs assumed to include program instructions or computer program code that, when executed by the respective processor, enables the respective electronic device or apparatus to operate in accordance with the embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to embodiments of the present invention, an apparatus representing the terminal 10 includes at least one processor 71, at least one memory 72 including computer program code, and at least one interface 73 configured for communication with at least another apparatus. The processor (i.e. the at least one processor 71, with the at least one memory 72 and the computer program code) is configured to perform receiving a broadcast service message, the broadcast service message comprising at least first information indicative of a target subscriber group, and second information relating to network selection (thus the apparatus comprising corresponding means for receiving), to perform comparing the first information with a preconfigured identifier indicative of an own subscriber group membership (thus the apparatus comprising corresponding means for comparing), and to perform processing the broadcast service message based on a comparison result (thus the apparatus comprising corresponding means for processing).

Further, according to embodiments of the present invention, an apparatus representing the network node 20 includes at least one processor 75, at least one memory 76 including computer program code, and at least one interface 77 configured for communication with at least another apparatus. The processor (i.e. the at least one processor 75, with the at least one memory 76 and the computer program code) is configured to perform transmitting a broadcast service message, the broadcast service message includes at least first information indicative of a target subscriber group and second information relating to network selection intended for the target subscriber group (thus the apparatus comprising corresponding means for transmitting).

For further details regarding the operability/functionality of the individual apparatuses, reference is made to the above description in connection with any one of FIGS. 1 to 6, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for subscriber group based cell broadcast. Such measures include receiving a broadcast service message, the broadcast service message including at least first information indicative of a target subscriber group, and second information relating to network selection, comparing the first information with a preconfigured identifier indicative of an own subscriber group membership, and processing the broadcast service message based on a comparison result.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Project
ANDSF access network discovery and selection function
CBS cell broadcast service
CMAS Commercial Mobile Alert Service
DM device management
EAP extensible authentication protocol
ETWS Earthquake and Tsunami Warning System
FQDN fully qualified domain network
ID identity
IP internet protocol
ISMP inter-system mobility policy
ISRP inter-system routing policy
LAC location area code
LTE Long Term Evolution
MO management object
OMA Open Mobile Alliance
OS operating system
OTA Over The Air, Over-The-Air
PLMN public land mobile network
PSK pre-shared key
RPLMN registered public land mobile network
TAC tracking area code
UE user equipment
WLAN wireless local area network

The invention claimed is:

1. A method performed at an apparatus comprising a processor and a memory, the method comprising:
at the processor, receiving a broadcast service message, said broadcast service message comprising at least first information indicative of a target subscriber group in at least one network, and second information relating to network selection, wherein the second information comprises at least connection information for the at least one network, and wherein the network selection comprises a selection between using certain networks and avoiding certain other networks based on load conditions of the certain networks and load conditions of the certain other networks;
at the processor, comparing said first information with a preconfigured identifier indicative of an own subscriber group membership; and
at the processor, processing said broadcast service message based on a comparison result,
wherein said first information is formed by a combination of a broadcast service message identifier and a serial number of said broadcast service message,
wherein the combination includes the broadcast service message identifier or a part of said broadcast service message identifier, with the serial number of said broadcast service message or a part of said serial number,
wherein the method further comprises at the processor, receiving, via a control signaling, said preconfigured identifier, and
wherein said control signaling is delivered using one of an open mobile alliance device management OMA DM message or an access network discovery and selection function management object ANDSF MO message.

2. The method according to claim 1, wherein said broadcast service message is processed if said combination matches with said preconfigured identifier.

3. The method according to claim 1, wherein
the method is operable at or by a terminal, user equipment, mobile station or modem, and/or
the method is operable in at least one of a 2G, 3G, LTE and a LTE-A cellular system, and/or
said broadcast service is a 2G/3G cell broadcast service CBS, a 4G earthquake and tsunami warning system ETWS or a 4G commercial mobile alert service CMAS; and/or
said second information is access network discovery and selection function ANDSF configuration data.

4. A computer program, embodied on a non-transitory computer readable medium, the computer program, when executed by a processor, causes the processor to carry out the method according to claim 1.

5. A method performed by an apparatus comprising a processor and a memory, the method comprising:
at the processor, transmitting a broadcast service message, said broadcast service message comprising at least first information indicative of a target subscriber group in at least one network, and second information relating to network selection intended for said target subscriber group, wherein said network selection comprises at least connection information for the at least one network, and wherein the network selection comprises a selection between using certain networks and avoiding certain other networks based on load conditions of the certain networks and load conditions of the certain other networks,
wherein said first information is formed by a combination of a broadcast service message identifier and a serial number of said broadcast service message,
wherein the combination includes the broadcast service message identifier or a part of said broadcast service message identifier, with the serial number of said broadcast service message or a part of said serial number,
wherein the method further comprises at the processor, transmitting, via a control signaling, to each subscriber of said plurality of broadcast service subscriber groups, said a respective allocated identifier, and
wherein said control signaling is delivered using one of an open mobile alliance device management OMA DM message or an access network discovery and selection function management object ANDSF MO message.

6. The method according to claim 5, further comprising
at the processor, allocating, to each subscriber of a plurality of broadcast service subscriber groups, an identifier corresponding to the respective broadcast service subscriber group;
wherein
in case of said target subscriber group, said allocated identifier matches with said first information.

7. The method according to claim 5, further comprising
at the processor, selecting, from said plurality of broadcast service subscriber groups, a broadcast service subscriber group as said target subscriber group.

8. The method according to claim 5, wherein
the method is operable at or by a network node of a cellular system, and/or
the method is operable in at least one of a 2G, 3G, LTE and a LTE-A cellular system, and/or
said broadcast service is a 2G/3G cell broadcast service CBS, a 4G earthquake and tsunami warning system ETWS or a 4G commercial mobile alert service CMAS; and/or
said second information is access network discovery and selection function ANDSF configuration data.

9. An apparatus comprising:
a connection controller configured to receive a broadcast service message, said broadcast service message comprising at least first information indicative of a target subscriber group in at least one network, and second information relating to network selection, wherein the second information comprises at least connection information for the at least one network, and wherein the network selection comprises a selection between using certain networks and avoiding certain other networks based on load conditions of the certain networks and load conditions of the certain other networks; and
a control module configured to
compare said first information with a preconfigured identifier indicative of an own subscriber group membership; and to
process said broadcast service message based on a comparison result,
wherein said first information is formed by a combination of a broadcast service message identifier and a serial number of said broadcast service message,
wherein the combination includes the broadcast service message identifier or a part of said broadcast service message identifier, with the serial number of said broadcast service message or a part of said serial number,
wherein said connection controller is further configured to receive, via a control signaling, said preconfigured identifier, and
said control signaling is delivered using one of an open mobile alliance device management OMA DM message or an access network discovery and selection function management object ANDSF MO message.

10. The apparatus according to claim 9, wherein said control module is configured to process said broadcast service message if said combination matches with said preconfigured identifier.

11. The apparatus according to claim 9, wherein the apparatus is operable as or at a terminal, user equipment, mobile station or modem, and/or the apparatus is operable in at least one of a 2G, 3G, LTE and a LTE-A cellular system, and/or said broadcast service is a 2G/3G cell broadcast service CBS, a 4G earthquake and tsunami warning system ETWS or a 4G commercial mobile alert service CMAS; and/or said second information is access network discovery and selection function ANDSF configuration data.

12. An apparatus comprising:

a connection controller configured to transmit a broadcast service message, said broadcast service message comprising at least first information indicative of a target subscriber group in at least one network, and second information relating to network selection intended for said target subscriber group, wherein the second information comprises at least connection information for at least one network, and wherein the network selection comprises a selection between using certain networks and avoiding certain other networks based on load conditions of the certain networks and load conditions of the certain other networks, wherein said first information is formed by a combination of a broadcast service message identifier and a serial number of said broadcast service message, wherein the combination includes the broadcast service message identifier or a part of said broadcast service message identifier, with the serial number of said broadcast service message or a part of said serial number, wherein said connection controller is further configured to transmit, via a control signaling, to each subscriber of said plurality of broadcast service subscriber groups, said a respective allocated identifier, and wherein said control signaling is delivered using one of an open mobile alliance device management OMA DM message or an access network discovery and selection function management object ANDSF MO message.

13. The apparatus according to claim 12, further comprising a control module configured to allocate, to each subscriber of a plurality of broadcast service subscriber groups, an identifier corresponding to the respective broadcast service subscriber group; wherein in case of said target subscriber group, said allocated identifier matches with said first information.

14. The apparatus according to claim 12, wherein said control module is further configured to select, from said plurality of broadcast service subscriber groups, a broadcast service subscriber group as said target subscriber group.

15. The apparatus according to claim 12, wherein the apparatus is operable as or at a network node of a cellular system, and/or the apparatus is operable in at least one of a 2G, 3G, LTE and a LTE-A cellular system, and/or said broadcast service is a 2G/3G cell broadcast service CBS, a 4G earthquake and tsunami warning system ETWS or a 4G commercial mobile alert service CMAS; and/or said second information is access network discovery and selection function ANDSF configuration data.

* * * * *